(12) United States Patent
Motoyoshi (10) Patent No.: US 9,698,895 B2
(45) Date of Patent: Jul. 4, 2017

(54) RELAY DEVICE, SATELLITE RELAY DEVICE, AND SATELLITE RELAY METHOD

(71) Applicant: Mitsubishi Electric Corporation, Chiyoda-ku (JP)

(72) Inventor: Katsuyuki Motoyoshi, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 218 days.

(21) Appl. No.: 14/411,990

(22) PCT Filed: Aug. 7, 2013

(86) PCT No.: PCT/JP2013/071395
§ 371 (c)(1),
(2) Date: Dec. 30, 2014

(87) PCT Pub. No.: WO2014/041932
PCT Pub. Date: Mar. 20, 2014

(65) Prior Publication Data
US 2015/0180568 A1    Jun. 25, 2015

(30) Foreign Application Priority Data

Sep. 14, 2012 (JP) ................................ 2012-202892

(51) Int. Cl.
*H04B 7/185* (2006.01)

(52) U.S. Cl.
CPC ..... *H04B 7/18582* (2013.01); *H04B 7/18515* (2013.01)

(58) Field of Classification Search
CPC .................... H04B 7/18515; H04B 7/18582
See application file for complete search history.

(56) References Cited

U.S. PATENT DOCUMENTS

| 6,760,342 B1 | 7/2004 | Skones et al. |
| 7,542,716 B2 | 6/2009 | Bell et al. |

(Continued)

FOREIGN PATENT DOCUMENTS

| JP | 2002-057593 A | 2/2002 |
| JP | 2011-130367 A | 6/2011 |

(Continued)

OTHER PUBLICATIONS

International Search Report issued Sep. 17, 2013 in PCT/JP2013/071395 Filed Aug. 7, 2013.

(Continued)

*Primary Examiner* — Derrick Ferris
*Assistant Examiner* — Farhad Ali
(74) *Attorney, Agent, or Firm* — Oblon, McClelland, Maier & Neustadt, L.L.P.

(57) ABSTRACT

A relay device includes first demultiplexing units that demultiplex reception signals into demultiplexed signals in a narrower band, first and second multiplexing units that multiplex input signals to generate multiplexed signals, transmission antennas that transmit the multiplexed signals generated by the multiplexing units, a regenerative relay unit that modulates an information sequence obtained by carrying out demodulation processing to the multiplexed signal generated by the second multiplexing unit to generate a modulated signal, a second demultiplexing unit that demultiplexes the modulated signal into a demultiplexed signal in a band narrower than the band of the reception signal, and a switch unit that inputs the demultiplexed signals demultiplexed by the first demultiplexing units to the multiplexing units and inputs the demultiplexed signal demultiplexed by the second demultiplexing unit to the first multiplexing units.

26 Claims, 4 Drawing Sheets

(56) References Cited

U.S. PATENT DOCUMENTS

| | | | |
|---|---|---|---|
| 8,731,123 B2 | 5/2014 | Fujimura | |
| 2004/0185775 A1* | 9/2004 | Bell | H04B 7/18515 455/12.1 |
| 2010/0296607 A1* | 11/2010 | Tuskamizu | H04B 7/0848 375/316 |
| 2013/0155941 A1 | 6/2013 | Fujimura | |
| 2013/0242857 A1 | 9/2013 | Tani | |
| 2014/0092804 A1* | 4/2014 | Scott | H04B 7/18515 370/316 |

FOREIGN PATENT DOCUMENTS

| | | |
|---|---|---|
| JP | 2013-141061 A | 7/2013 |
| WO | WO 2011/065287 A1 | 6/2011 |
| WO | WO 2012/026417 A1 | 3/2012 |
| WO | WO 2012/120743 A1 | 9/2012 |
| WO | WO 2014/112040 A1 | 7/2014 |

OTHER PUBLICATIONS

Shinichi Taira, et al., "Development of an onboard circuit switch and performance tests in the geostationary satellite orbit", The Transactions of the Institute of Electronics, Information and Communication Engineers, vol. J93-B, No. 7, Jul. 2010, pp. 868-877 (with English translation of pertinent portions).

Naoto Kadowaki, et al., "Development of on-board switching technology in wideband internetworking engineering test and demonstrations satellite (WINDS)", The Transactions of the Institute of Electronics, Information and Communication Engineers, vol. J93-B, No. 8, Aug. 2010, pp. 1035-1042 (with English translation of pertinent portions).

Yukio Hashimoto, "The on-board processor for a voice communication switching", Communication Research Laboratory Seasonal Report, vol. 49, No. 3/4, 2003, pp. 73-81 (with English Abstract).

Notice of Rejection issued Jun. 2, 2015 in Japanese Patent Application No. 2014-535452 (with partial English language translation).

\* cited by examiner

RELAY DEVICE, SATELLITE RELAY DEVICE, AND SATELLITE RELAY METHOD

FIELD

The present invention relates to a relay device, a satellite relay device, and a satellite relay method.

BACKGROUND

A conventional satellite on-board regenerative relay exchange performs regenerative relay per sub-channels demultiplexed by a channelizer and is configured to be specialized for regenerative relay of the same service such as sound communication (see, for example, Non Patent Literature 1).

CITATION LIST

Non Patent Literature

Non Patent Literature 1: Hashimoto, "The on-board Processor for a Voice Communication Switching," Communication Research Laboratory Seasonal Report Vol. 49 Nos. 3/4 pp. 73-81, 2003

SUMMARY

Technical Problem

However, because the conventional satellite on-board regenerative relay exchange is configured to be specialized for regenerative relay of the same service such as sound communication, there is a problem in that, in a relay satellite expected to house a variety of terminals different in transmission and reception performance such as a multi-beam satellite, mixed relay of regenerative relay and non-regenerative relay cannot be realized in a form not depending on band occupancy and frequency allocation of radio signals transmitted and received by the respective terminals.

The present invention has been devised in view of the above and it is an object of the present invention to obtain a relay device, a satellite relay device, and a satellite relay method that can realize mixed relay of a regenerative relay signal and a non-regenerative relay signal.

Solution to Problem

In order to solve the aforementioned problems, a relay device according to one aspect of the present invention includes: a first demultiplexing unit that demultiplexes a reception signal to generate a demultiplexed signal in a band narrower than a band of the reception signal; first and second multiplexing units that multiplex input signals to generate multiplexed signals; a transmission antenna that transmits the multiplexed signal generated by the first multiplexing unit; a regenerative relay unit that carries out demodulation processing on the multiplexed signal generated by the second multiplexing unit and modulates an information sequence obtained by the demodulation processing to generate a modulated signal; a second demultiplexing unit that demultiplexes the modulated signal to generate a demultiplexed signal in a band narrower than the band of the reception signal; and a switch unit that inputs the demultiplexed signal generated by the first demultiplexing unit to the first multiplexing unit or the second multiplexing unit and inputs the demultiplexed signal generated by the second demultiplexing unit to the first multiplexing unit.

Advantageous Effects of Invention

According to the present invention, there is an effect that it is possible to realize mixed relay of a regenerative relay signal and a non-regenerative relay signal in a multi-beam communication satellite.

DESCRIPTION OF EMBODIMENTS

Embodiments of a relay device, a satellite relay device, and a satellite relay method according to the present invention are explained in detail below with reference to the drawings. Note that the present invention is not limited by the embodiments.

First Embodiment

Figure 1:
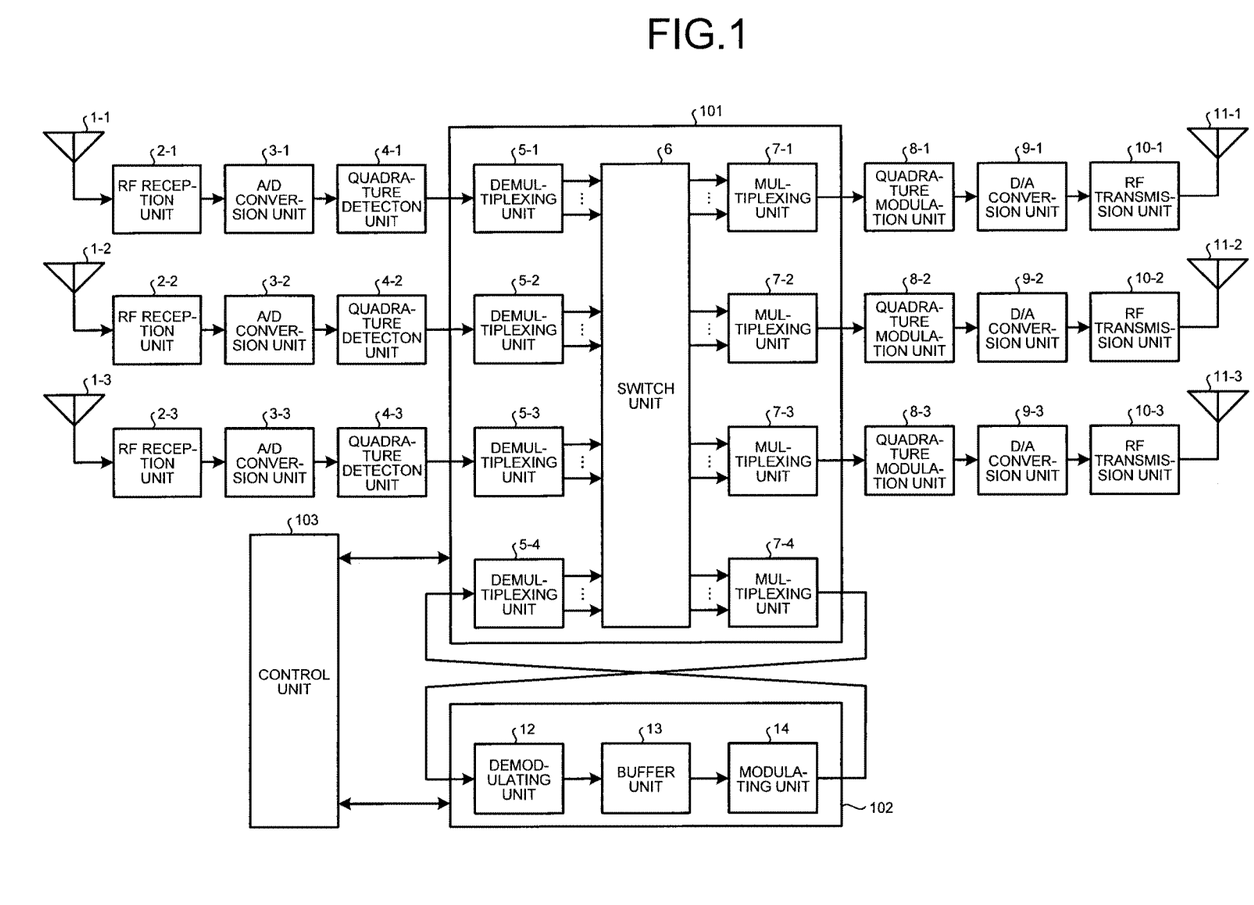
FIG. 1 is a diagram of a functional configuration example of a satellite relay device in a first embodiment.

FIG. 1 is a diagram of a functional configuration example of a first embodiment of a satellite relay device according to the present invention. As shown in FIG. 1, in this embodiment, the satellite relay device includes reception antennas 1-1 to 1-3, RF (Radio Frequency) reception units 2-1 to 2-3, A/D (Analog/Digital) conversion units 3-1 to 3-3, quadrature detection units 4-1 to 4-3, demultiplexing units 5-1 to 5-4, a switch unit 6, multiplexing units 7-1 to 7-4, quadrature modulation units 8-1 to 8-3, D/A (Digital/Analog) conversion units 9-1 to 9-3, RF transmission units 10-1 to 10-3, transmission antennas 11-1 to 11-3, a demodulating unit 12, a buffer unit 13, a modulating unit 14, and a control unit 103.

The demultiplexing units 5-1 to 5-4, the switch unit 6, and the multiplexing units 7-1 to 7-4 configure a channelizer 101. The demodulating unit 12, the buffer unit 13, and the modulating unit 14 configure a regenerative relay unit 102.

The satellite relay device in this embodiment is a relay device mounted on, for example, an artificial satellite and is a device that receives an RF signal transmitted from a terminal or the like and relays the signal to a destination terminal or the like. Note that the satellite relay device is explained as an example. However, the present invention is also applicable to relay devices other than the satellite relay device.

Operations in this embodiment are explained. The RF reception units 2-$i$ connected to reception antennas 1-$i$ ($i$=1, 2, and 3) carry out analog signal processing such as filter processing, amplification processing, and frequency conversion processing on RF signals (reception signals) received by the reception antennas 1-$i$ to thereby convert the RF signals into IF (Intermediate Frequency) signals.

The A/D conversion units 3-$i$ sample the IF signals output from the RF reception units 2-$i$ into digital signals. The demultiplexing units 5-$i$ (first demultiplexing units) subdivide (demultiplex) the digital signals into a plurality of bands (sub-channels) and output sub-channel signals in a band narrower than a band of the input digital signals. The demultiplexing unit 5-4 (a second demultiplexing unit) connected to the regenerative relay unit 102 instead of a reception antenna also subdivides an input signal into a plurality of bands (sub-channels) like the other demultiplexing units 5-1 to 5-3.

The demultiplexing units 5-1 to 5-4 respectively output a subdivided plurality of demultiplexed wave signals (sub-channel signals) to the switch unit 6. The switch unit 6 routes the sub-channel signals, which are input from the demultiplexing units 5-1 to 5-4, to desired sub-channel bands of desired multiplexing units 7-1 to 7-4 on the basis of an instruction of the control unit 103.

Output signals of the multiplexing units 7-1 to 7-3 (first multiplexing units) are respectively connected to systems of the transmission antennas 11-1 to 11-3 (hereinafter referred to as non-regenerative relay systems). On the other hand, the multiplexing unit 7-4 (a second multiplexing unit) is connected to the regenerative relay unit 102, which is a regenerative relay system. In this way, the demultiplexing units having different systems of connection destinations on output sides are connected to the switch unit 6. However, there is no difference in forms of the sub-channels signals, which are demultiplexing unit interfaces from the viewpoint of the switch unit 6. Therefore, in association (routing) of an input sub-channel and an output sub-channel in the switch unit 6, it is unnecessary to particularly consider a difference between the regenerative relay system (including the demultiplexing unit 5-4 and the multiplexing unit 7-4) and the non-regenerative relay system (including the demultiplexing units 5-1 to 5-3 and the multiplexing units 7-1 to 7-3).

The multiplexing units 7-1 to 7-4 arrange a plurality of sub-channel signals output from the switch unit 6 on frequency axes, combine the sub-channel signals into signals in a band wider than the sub-channels, and output the signals. The output signals of the multiplexing units 7-*j* (*j*=1, 2, and 3) are input to the quadrature modulation units 8-*j*. The quadrature modulation units 8-*j* convert the input signals into digital IF signals and output the digital IF signals to the D/A conversion units 9-*j*. The D/A conversion units 9-*j* convert the digital IF signal into analog signals and output the analog signals to the RF transmission units 10-*j*. The RF transmission units 10-*j* carry out analog signal processing for the input analog signals, convert the analog signals into RF signals, and transmit the RF signals from the transmission antennas 11-*j*.

On the other hand, the output signal of the multiplexing unit 7-4 is input to the regenerative relay unit 102. In the regenerative relay unit 102, the demodulating unit 12 applies demodulation processing to a regenerative relay line signal included in the output signal from the multiplexing unit 7-4. After being once stored in the buffer unit 13, a demodulation result of the demodulation processing is input to the modulating unit 14 at desired transmission timing. The transmission timing is controlled by the control unit 103. Error correction decoding processing can be included in the demodulation processing of the demodulating unit 12. The modulating unit 14 modulates the input signal and outputs the signal to the demultiplexing unit 5-4. Error correction encoding processing may be included in the modulation processing. The signal input to the demultiplexing unit 5-4 is a signal equivalent to (having the same form or the like as) the signals input to the demultiplexing units 5-1 to 5-3. Therefore, the channelizer 101 is capable of uniformly treating a regenerative relay signal and a non-regenerative relay signal.

Note that, when a plural kinds of signals are included in the regenerative relay signal, different kinds of demodulation processing and modulation processing can be carried out for each of the kinds of signals. The modulation processing can be carried out in a modulation system different from a modulation system applied to the received regenerative relay signal (i.e., the modulation processing corresponding to the demodulation processing carried out by the demodulating unit 12) and also at transmission timing and in the order different from the transmission timing and the order in the modulation system applied to the regenerative relay signal.

When a plurality of regenerative relay line signals are input to an output of the multiplexing unit 7-4 in a frequency-multiplexing manner, a filter unit that extracts the respective signals can be provided in the demodulating unit 12. However, a signal halfway in a multiplexing process of the multiplexing unit 7-4 can be extracted and output to the demodulating unit 12. By configuring the multiplexing unit 7-4 in this way, the multiplexing unit 7-4 carries out the role of an extraction filter on the demodulating unit 12 side. Therefore, the configuration can be simplified. Similarly, the demultiplexing unit 5-4 inputs a signal halfway in a demultiplexing process to the demodulating unit 12. Therefore, a combining filter for creating a demultiplexed input from a plurality of modulation outputs in the modulating unit 14 can be simplified. Concerning a method of realizing the demultiplexing unit and the multiplexing unit capable of outputting the halfway processes of demultiplexing and multiplexing, for example, a method disclosed in WO 2011/065287 can be used.

Figure 2:
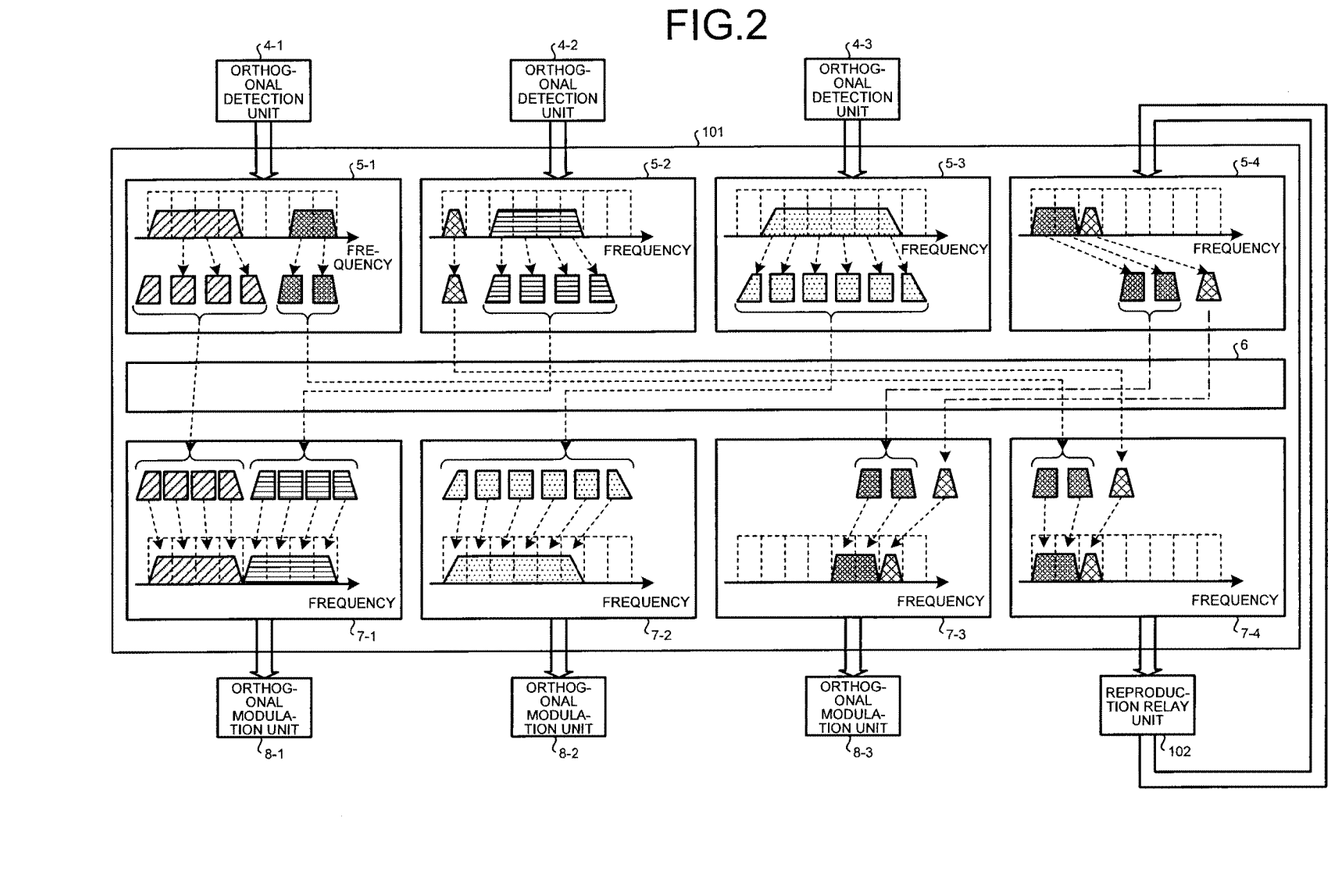
FIG. 2 is a diagram of an example of a signal processing process in the satellite relay device in the first embodiment.

FIG. 2 is a diagram of an example of a signal processing process in the satellite relay device in this embodiment. Details of the signal processing process in the satellite relay device in this embodiment are explained with reference to FIG. 2. As shown in FIG. 2, output signals of the quadrature detection units 4-1 to 4-3 are respectively decomposed (demultiplexed) into individual sub-channel signals by the demultiplexing units 5-1 to 5-3. In an example shown in FIG. 2, each of outputs of the quadrature detection units 4-1 to 4-3 is demultiplexed into eight sub-channels. However, FIG. 2 is an example and the number of sub-channels to be demultiplexed is not limited to eight. In FIG. 2, frequency spectra shown in the upper parts of respective frames of the demultiplexing units 5-1 to 5-3 indicate input signals to the demultiplexing units 5-1 to 5-3. The input signals are demultiplexed into individual sub-channels by the demultiplexing units 5-1 to 5-3 as shown in the lower parts in the respective frames of the demultiplexing units 5-1 to 5-3. Note that sub-channels in which signals are absent are not shown in FIG. 2.

The sub-channels demultiplexed by the demultiplexing units 5-1 to 5-3 are input to desired multiplexing units 7-1 to 7-4 in the switch unit 6. When the sub-channels are input to the multiplexing units 7-1 to 7-4, sub-channel frequencies of the multiplexing units in which the sub-channels are arranged are designated. The multiplexing units 7-1 to 7-4 multiplex an input plurality of sub-channel signals such that the respective sub-channels change to designated frequencies. As it is seen from FIG. 2, the function of input/output interface of the switch unit 6 is performed per each sub-channel. Note that demultiplexing unit and frequency arrangement on output sides of the sub-channels is instructed to the switch unit 6 from the control unit 103 in FIG. 1. This instruction can take, for example, a form of a routing table between an input and an output.

The sub-channel signals input to the multiplexing units 7-1 to 7-3 connected to the quadrature modulation units 8-1 to 8-3 among the multiplexing units 7-1 to 7-4 are non-regenerative relay signals. The sub-channel signals are output to the quadrature modulation units 8-1 to 8-3 after being multiplexed and are finally transmitted from the transmission antennas 11-1 to 11-3.

On the other hand, the sub-channel signals input to the multiplexing unit 7-4 are regenerative relay signals. The sub-channel signals change to an input signal to the regenerative relay unit 102 after being multiplexed. In the example shown in FIG. 2, in the frequency spectra after the multiplexing (shown in the lower part in the frame of the multiplexing unit 7-4 in FIG. 2), two kinds of signals indicated by different hatchings are inputs to the regenerative relay unit 102. These signals are demodulated in the regenerative relay unit 102 into an information sequence. Thereafter, the signals are modulated again and input to the channelizer 101 again. The signals input to the channelizer 101 through the regenerative relay unit 102 are decomposed into sub-channels by the demultiplexing unit 5-4. Thereafter, the signals are input to the multiplexing units 7-1 to 7-3 by the switch unit 6. The input signals are multiplexed in the same manner as the non-regenerative relay signal by the multiplexing units 7-1 to 7-3. Finally, the input signals are transmitted by the transmission antennas 11-1 to 11-3. Note that, in the example shown in FIG. 2, the regenerative relay signal is input to only the multiplexing unit 7-3. However, an input destination of the regenerative relay signal only has to be one or more of the multiplexing units 7-1 to 7-3. As it is evident from the above explanation, in the satellite relay device in this embodiment, the regenerative relay signal and the non-regenerative relay signal are multiplexed in a mixed state. A waveform in which the regenerative relay signal and the non-regenerative relay signal are mixed can be transmitted from the same transmission antenna.

As it is evident from the above operation explanation, in this embodiment, the regenerative relay signal passes the channelizer twice. Consequently, the switch unit 6 is used in common for the regenerative relay signal and the non-regenerative relay signal. The routing of the sub-channel signals are also used in common. That is, the satellite relay device in this embodiment does not need to include a special switch unit for regenerative relay different from a switch unit for non-regenerative relay.

Further, as explained above, the demultiplexing units 5-1 to 5-4 and the multiplexing units 7-1 to 7-4 are configured to make it possible to input and output signals in halfway stages of demultiplexing and multiplexing. Therefore, it is unnecessary to carry out processing for further demultiplexing an output signal of the multiplexing unit 7-4 in the regenerative relay unit 102 to extract respective signals for regenerative relay and multiplexing the respective signals for regenerative relay in the modulating unit 14 for the demultiplexing unit 5-4. This means that components on the inside of the demultiplexing units 5-1 to 5-4 and of the multiplexing units 7-1 to 7-4 can be used in common, that is, it is unnecessary to prepare a special demultiplexing unit for regenerative relay. With this characteristic, in the satellite relay device including the channelizer, by changing the number and a processing ability of regenerative relay units connected to the channelizer, it is possible to flexibly change the ratio of a non-regenerative relay band and a regenerative relay band even in the same channelizer.

Note that, in FIG. 1, a configuration diagram in which the number of both of the transmission antennas and the reception antennas is three. However, the number of the transmission antennas and that of the reception antennas is not limited to this. The present invention can also be applied to a configuration in which the number of transmission antennas and that of reception antennas are different.

In the configuration shown in FIG. 1, an input signal from a single reception antenna (e.g., the reception antenna 1-1) is input to a single demultiplexing unit (e.g., the demultiplexing unit 5-1) and an output of a single multiplexing unit (e.g., the multiplexing unit 7-1) is output to a single transmission antenna (e.g., the transmission antenna 11-1). However, the present invention is also applicable in carrying out beam forming (an analog system or a digital system or a hybrid system of the analog system and the digital system) for forming a beam using a plurality of antennas on a satellite. When an input to the channelizer 101 is a beam, respective beams formed by the beam forming are inputs and outputs of the demultiplexing units 5-1 to 5-3 and the multiplexing units 7-1 to 7-3 of the channelizer 101. Naturally, different beam forming systems can be applied on the transmission side and the reception side (including the case in which the beam forming is not used).

Further, the present invention is also applicable to a system in which the digital beam forming is performed in units of sub-channels of a demultiplexing output and a multiplexing input. When reception digital beam forming is performed per sub-channel, an inner product (a reception digital beam forming output) of a reception signal vector formed by a plurality of sub-channel signals output from a plurality of demultiplexing units and an antenna weight vector forming a reception beam is made an input to the switch unit 6. When transmission digital beam forming is performed per sub-channel, elements of a vector obtained as a result of multiplying the sub-channel signals output from the switch unit 6 with an antenna weight vector forming a transmission beam are input to the multiplexing units 7-1 to 7-3. As a result of the reception digital beam forming, in the multiplexing units 7-1 to 7-3, a plurality of input signals are sometimes present in a specific sub-channel input. However, in that case, an added-up signal of the input signals is made an input to the multiplexing units 7-1 to 7-3. In the addition, the respective input signals before the addition can be added up after being multiplied with a weight coefficient. Note that setting values of the weight vector, the weight coefficient, sub-channel allocation and the like are controlled by the control unit 103. The multiplication of the weight coefficient in the beam forming system can be performed during the routing (i.e., the channelizer 101 can perform the multiplication of the weight coefficient in the beam forming system).

The configuration shown in FIG. 1 is a configuration in which all of the reception antennas 1-1 to 1-3 and the transmission antennas 11-1 to 11-3 are connected to the channelizer 101. However, a part or all of transmission bands and reception bands can be connected to separate bent pipe systems (systems for analogically converting and relaying center frequencies of an input and an output not through a channelizer). In that case, a part or all of transmission bands and reception bands processable by the channelizer 101 and transmission bands and reception bands processable by the bent pipe systems can overlap or the transmission bands and the reception bands do not have to overlap at all.

In the configuration shown in FIG. 1, the quadrature detection units 4-1 to 4-3 and the quadrature modulation units 8-1 and 8-3 are arranged between the A/D conversion units 3-1 to 3-3 and the D/A conversion units 9-1 and 9-3 and the channelizer 101. A/D conversion and D/A conversion are performed as IF sampling operations. However, the satellite relay device is not limited to this configuration. Both or one of the A/D conversion and the D/A conversion can be performed as complex baseband sampling.

In the configuration shown in FIG. 1, the regenerative relay unit 102 connected to the channelizer 101 is only one system. However, a plurality of the regenerative relay units 102 can be connected to the channelizer 101. In that case, a method of preparing, by the number of the regenerative relay units 102, demultiplexing units and multiplexing units connected to the regenerative relay units 102 can be adopted. Alternatively, a method of connecting a plurality of regenerative relay units to a set of a demultiplexing unit and a multiplexing unit can be adopted.

As explained above, in the satellite relay device in this embodiment, a part of the output of the channelizer 101 is input to the regenerative relay unit 102 and the signal after processing by the regenerative relay unit 102 is input to the channelizer 101 again. Consequently, the switch unit 6 of the channelizer 101 is capable of performing routing of sub-channels without distinguishing the regenerative relay and the non-regenerative relay. Therefore, an effect is obtained that it is possible to easily realize a relay in which the regenerative relay and the non-regenerative relay are mixed.

Further, with the satellite relay device in this embodiment, the demultiplexing units 5-1 to 5-4 and the multiplexing units 7-1 to 7-4 configuring the channelizer 101 can be formed in a circuit configuration common to the regenerative relay system and the non-regenerative relay system. Therefore, an effect of a reduction in costs of the device through common parts utilization is obtained.

Furthermore, with the satellite relay device in this embodiment, a switch system and a demultiplexing and multiplexing system are used in common in the regenerative relay and the non-regenerative relay. Therefore, an effect is obtained that it is possible to realize a relay capable of freely setting a ratio of a regenerative relay band and a non-regenerative relay band according to a use.

Second Embodiment

Figure 3:
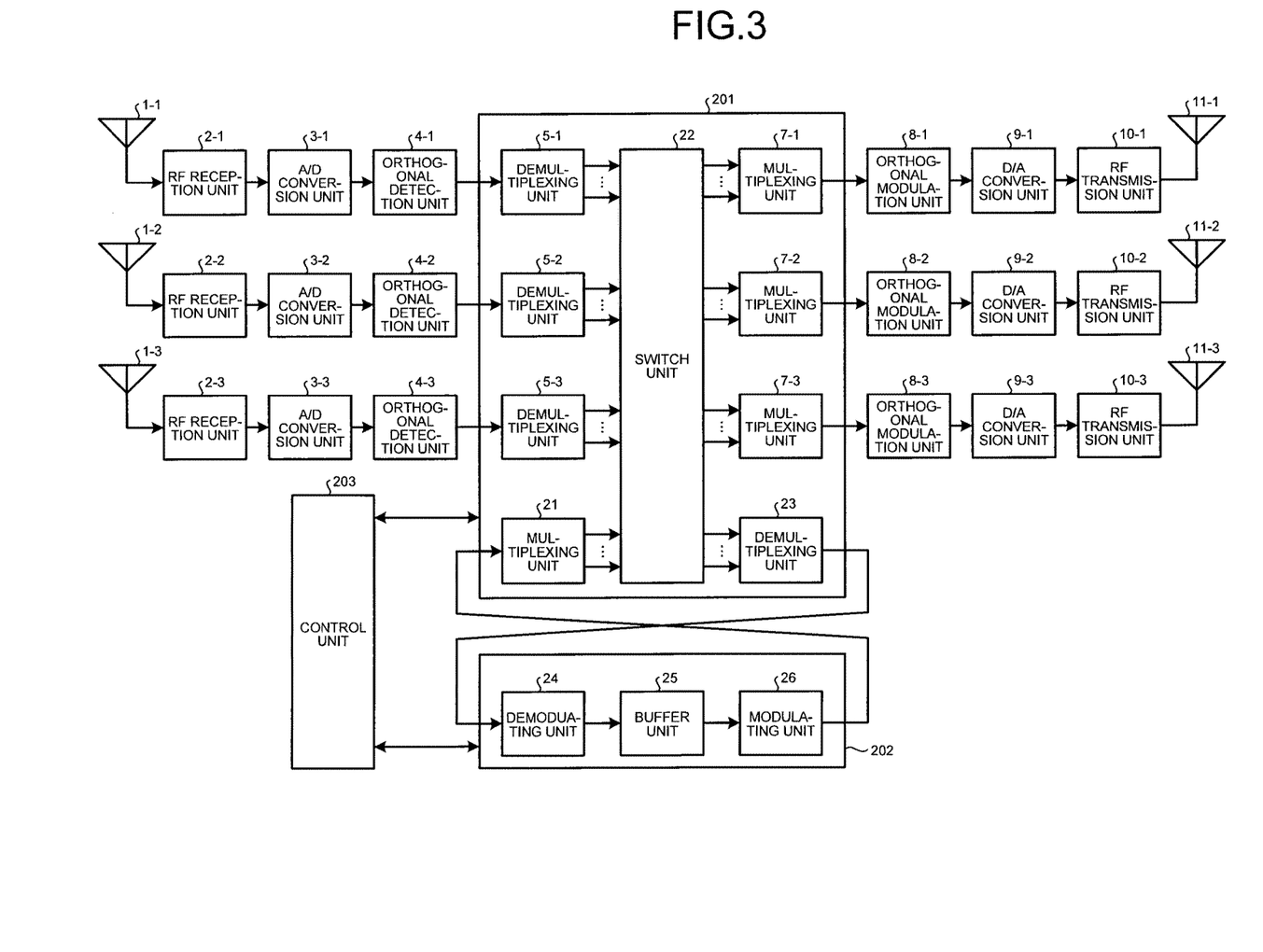
FIG. 3 is a diagram of a functional configuration example of a satellite relay device in a second embodiment.

FIG. 3 is a diagram of a functional configuration example of a second embodiment of the satellite relay device according to the present invention. As shown in FIG. 3, in this embodiment, the satellite relay device includes the reception antennas 1-1 to 1-3, the RF reception units 2-1 to 2-3, the A/D conversion units 3-1 to 3-3, the quadrature detection units 4-1 to 4-3, the demultiplexing units 5-1 to 5-3 and a demultiplexing unit 23, a switch unit 22, the multiplexing units 7-1 to 7-3 and a multiplexing unit 21, the quadrature modulation units 8-1 to 8-3, the D/A conversion units 9-1 to 9-3, the RF transmission units 10-1 to 10-3, the transmission antennas 11-1 to 11-3, a demodulating unit 24, a buffer unit 25, a modulating unit 26, and a control unit 203.

The demultiplexing units 5-1 to 5-3 and 23, the switch unit 22, and the multiplexing units 7-1 to 7-3 and 21 configure a channelizer 201. The demodulating unit 24, the buffer unit 25, and the modulating unit 26 configure a regenerative relay unit 202.

The satellite relay device in this embodiment is the same as the satellite relay device in the first embodiment except that the satellite relay device includes the multiplexing unit 21, the demultiplexing unit 23, the regenerative relay unit 202, the switch unit 22, and the control unit 203 instead of the demultiplexing unit 5-4, the multiplexing unit 7-4, the regenerative relay unit 102, the switch unit 6, and the control unit 103. Constituent elements having functions same as the functions of the constituent elements in the first embodiment are denoted by reference numerals and signs same as the reference numerals and signs in the first embodiment. Redundant explanation of the constituent elements is omitted.

This embodiment is different from the first embodiment in that the demultiplexing unit 23 is connected to an input (the demodulating unit 24) side of the regenerative relay unit 202 and the multiplexing unit 21 is connected to an output (the modulating unit 26) of the regenerative relay unit 202.

Next, operations in this embodiment are explained. Note that explanation is omitted concerning sections that perform operations same as the operations in the first embodiment. Differences from the first embodiment are explained. In the switch unit 22, sub-channel signals (first demultiplexed signals) demultiplexed in the demultiplexing units 5-1 to 5-3 are routed to desired frequencies of desired multiplexing units 7-1 to 7-3 or demultiplexing unit 23 (second demultiplexing units) designated by the control unit 203. Note that, in the routing in the switch unit 22, besides normal one-to-one connection, one-to-N (N is an integer equal to or larger than 2) connection for duplicating a sub-channel signal input into a plurality of sub-channel signal outputs, N-to-one connection for adding up a plurality of sub-channel signal inputs into one sub-channel signal output, and the like can be adopted. When the input sub-channel signal input is duplicated to output a plurality of sub-channel signals, each output signal can be multiplied with a different weight coefficient. In the routing, input sub-channel signals can be multiplied with a weight coefficient of a real number or a complex number. Further, the sub-channels with which a weight coefficient of a real number or a complex number has been multiplied can be added. The same effect can be obtained irrespective of in which of the demultiplexing unit, the multiplexing unit, and the switch unit the weight coefficient multiplication is implemented. Among outputs of the demultiplexing units 5-1 to 5-3, sub-channel signals including a signal for regenerative relay are input to the demultiplexing unit 23. Similarly, the switch unit 6 in the first embodiment can be any one of the one-to-one connection, the N-to-one connection, and the one-to-N connection. Sub-channel signals can be multiplied with a weight coefficient of a real number or a complex number.

The demultiplexing unit 23 demultiplexes input sub-channel signals into sub-channels in a narrower band and outputs the sub-channel signals to the regenerative relay unit 202. For the demultiplexing unit 23, unlike the demultiplexing units 5-1 to 5-3, a plurality of sub-channel signals are made input signals. The configuration of the demultiplexing unit 23 in this case is equivalent to the configuration of the demultiplexing unit that inputs a signal halfway in demultiplexing as explained in the first embodiment.

The sub-channel signals (the second demultiplexed signals) in the narrow band output from the demultiplexing unit 23 are input to the demodulating unit 24 of the regenerative relay unit 202. The demodulating unit 24 demodulates the input sub-channel signals in the narrow band and stores an information sequence in the buffer unit 25 as a demodulation result. The modulating unit 26 modulates the information sequence read out from the buffer unit 25 and outputs the information sequence to the multiplexing unit 21 (the second multiplexing unit). Frequency resolution of an input signal to the multiplexing unit 21 is equivalent to frequency resolution of the sub-channel signals in the narrow band output by the demultiplexing unit 23. The multiplexing unit 21 multiplexes the input sub-channel signals in the narrow band and outputs the sub-channel signals. Frequency resolution of an output signal of the multiplexing unit 21 is equivalent to frequency resolution of the sub-channel signals output by the demultiplexing units 5-1 to 5-3. However, concerning the input side of the multiplexing unit 21, because sub-channel signals are input from a halfway stage of the multiplexing processing of the multiplexing unit 21, the sub-channel signals can be made signals having frequency resolution larger than frequency resolution of the output of the multiplexing unit 23.

An output of the multiplexing unit 21 connected to the switch unit 22 and an input to the demultiplexing unit 23 connected to the switch unit 22 are respectively equivalent to the outputs of the demultiplexing units 5-1 to 5-3 and the inputs to the multiplexing units 7-1 to 7-3. Therefore, the switch unit 22 is capable of realizing mixed relay of the regenerative relay and the non-regenerative relay without distinguishing the regenerative relay and the non-regenerative relay. The sub-channel signals demultiplexed by the demultiplexing units 5-1 to 5-3 are more finely demultiplexed in the demultiplexing unit 23 via the switch unit 22. Consequently, on the regenerative relay unit 202 side, it is unnecessary to, for example, set a filter for extracting respective regenerative relay signals from the signals in which a plurality of regenerative relay signals are frequency-multiplexed.

Figure 4:
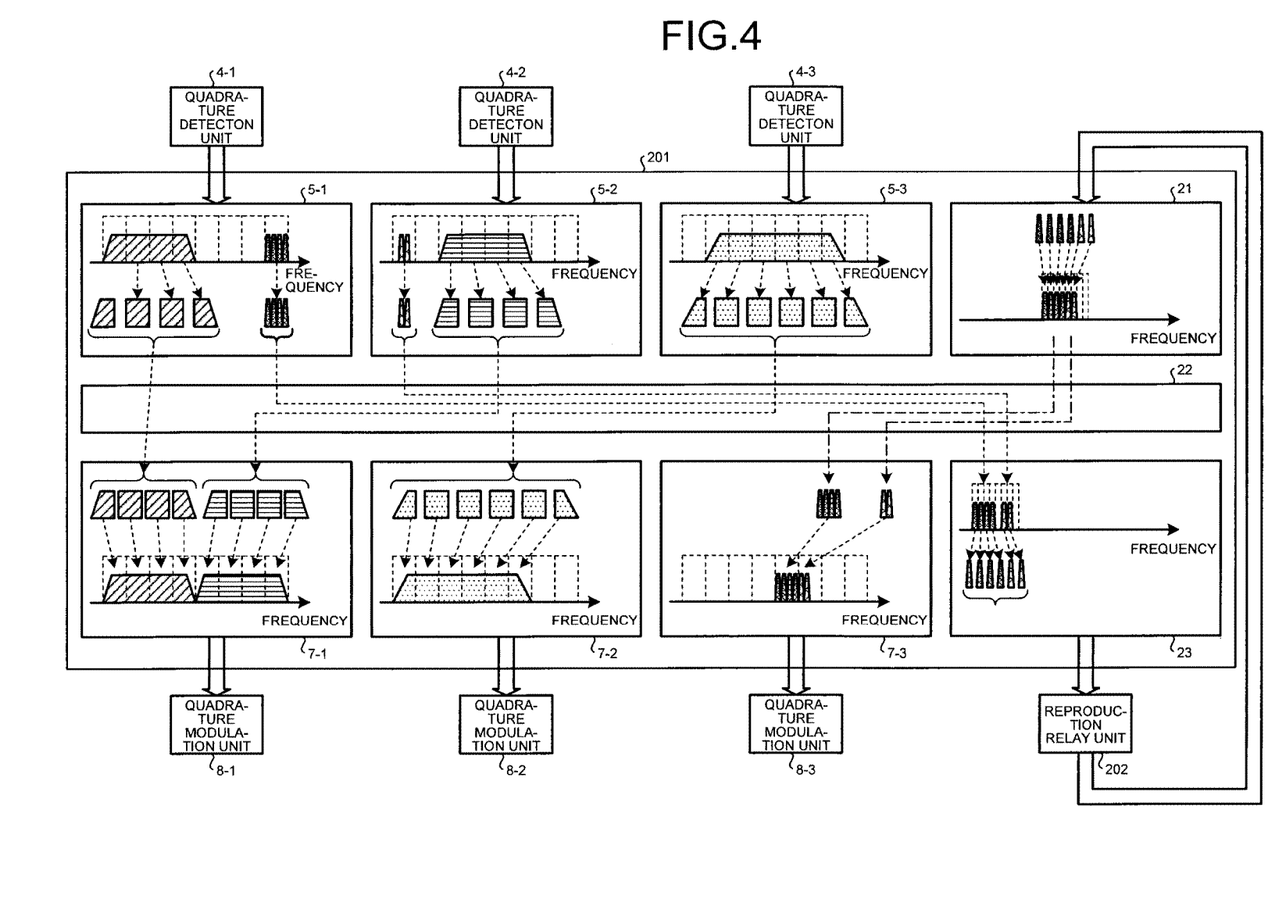
FIG. 4 is a diagram of an example of a signal processing process in the satellite relay device in the second embodiment.

FIG. 4 is a diagram of an example a signal processing process in the satellite relay device in this embodiment. Details of the signal processing process in the satellite relay device in this embodiment is explained below with reference to FIG. 4.

The sub-channel signals input to the demultiplexing unit 23 are more finely demultiplexed into sub-channel signals in a narrow band. Thereafter, the sub-channel signals are output to the regenerative relay unit 202. In an example shown in FIG. 4, the demultiplexing unit 23 further demultiplexes, at quadruple frequency resolution, signals for two sub-channels output from the switch unit 22. However, the input band and the frequency resolution after the demultiplexing are not limited to these values. The regenerative relay unit 202 extracts a signal for regenerative relay from the sub-channel signals in the narrow band output from the demultiplexing unit 23 and, after demodulating the extracted signal, modulates the signal and outputs the signal to the multiplexing unit 21. Setting of a modulation system of modulation processing, transmission timing, and the like of the regenerative relay unit 202 can be different from the setting for the input of the demodulated signal. These settings are performed by the control unit 203.

Note that, in the regenerative relay unit 202, if a processing for performing gain control per each of the sub-channels without performing modulation and demodulation of an input is added, it is possible to realize functions such as a notch filter narrower in a band than the resolution of the sub-channels of the demultiplexing units 5-1 to 5-3 and a filter for adjusting a frequency characteristic at finer granularity.

Note that, in FIG. 3, for simplification of explanation, a configuration diagram in which the number of transmission and reception antennas is three is shown.

However, as explained in the first embodiment, the present invention can also be applied when the beam forming is performed. Further, the present invention is also applicable to a system for performing the digital beam forming per each sub-channel of a demultiplexing output and multiplexing input. In this case, setting values of the weight vector, the weight coefficient, the channel allocation, and the like are controlled by the control unit 203.

In the configuration explained above, all of the reception antennas 1-1 to 1-3 and the transmission antennas 11-1 to 11-3 are connected to the channelizer 201. However, as explained in the first embodiment, a part or all of transmission bands and reception bands can be connected to another bent pipe system. Both or one of the A/D conversion and the D/A conversion can be performed as complex baseband sampling.

In the configuration shown in FIG. 3, the regenerative relay unit 202 connected to the channelizer 201 is only one system. However, a plurality of the regenerative relay units 202 can be connected to the channelizer 201. In that case, a method of preparing, by the number of the regenerative relay units 202, demultiplexing units and multiplexing units connected to the regenerative relay units 202 can be adopted. Alternatively, a method of connecting a plurality of the regenerative relay units 202 to a set of a demultiplexing unit and a multiplexing unit can be adopted.

As explained above, in this embodiment, the switch unit 22 inputs the sub-channel signals including the signal for regenerative relay to the demultiplexing unit 23. The demultiplexing unit 23 further demultiplexes the input sub-channel signals into sub-cannel signals in a narrower band and inputs the sub-channel signals to the regenerative relay unit 202. Then the output of the regenerative relay unit 202 is input to the multiplexing unit 21. The multiplexing unit 21 multiplexes the input sub-channel signals in the narrow band into a signal having frequency resolution equivalent to frequency resolution of the sub-channel signals output by the demultiplexing units 5-1 to 5-3 and inputs the signal to the switch unit 22. Therefore, effects same as the effects in the first embodiment can be obtained. When a radio signal in a band narrower than a sub-channel band width of the non-regenerative relay system is reproduced and relayed, demultiplexing and multiplexing processing does not have to be carried out in the regenerative relay unit. Therefore, effects such as a circuit size reduction and a cost reduction of the regenerative relay unit are obtained.

INDUSTRIAL APPLICABILITY

As explained above, the relay device, the satellite relay device, and the satellite relay method according to the present invention are useful for a multi-beam communication satellite and, in particular, suitable for a satellite relay device that carries out both of regenerative relay and non-regenerative relay.

REFERENCE SIGNS LIST

1-1 to 1-3 Reception antennas
2-1 to 2-3 RF reception units
3-1 to 3-3 A/D conversion units
4-1 to 4-3 Quadrature detection units
5-1 to 5-4, 23 Demultiplexing units
6, 22 Switch units
7-1 to 7-4, 21 Multiplexing units
8-1 to 8-3 Quadrature modulation units
9-1 to 9-3 D/A conversion units
10-1 to 10-3 RF transmission units
11-1 to 11-3 Transmission antennas
12, 24 Demodulating units
13, 25 Buffer units
14, 26 Modulating units
101, 201 Channelizers
102, 202 Regenerative relay units
103, 203 Control units

The invention claimed is:

1. A relay device comprising:
   a first demultiplexing unit that demultiplexes a reception signal to generate a demultiplexed signal in a band narrower than a band of the reception signal;
   a first multiplexing unit that multiplexes a first input signal to generate a first multiplexed signal;
   a second multiplexing unit that multiplexes a second input signal to generate a second multiplexed signal;
   a transmission antenna that transmits the first multiplexed signal generated by the first multiplexing unit;
   a regenerative relay unit that carries out demodulation processing on the second multiplexed signal generated by the second multiplexing unit and modulates an information sequence obtained by the demodulation processing to generate a modulated signal;
   a second demultiplexing unit that demultiplexes the modulated signal to generate a demultiplexed signal in a band narrower than the band of the reception signal; and
   a switch unit that inputs the demultiplexed signal generated by the first demultiplexing unit to the first multiplexing unit or the second multiplexing unit and inputs the demultiplexed signal generated by the second demultiplexing unit to the first multiplexing unit.

2. The relay device according to claim 1, wherein the regenerative relay unit carries out the demodulation processing in a different demodulation system for each type of the demodulated signal.

3. The relay device according to claim 1, wherein the demodulation processing includes error correction decoding processing.

4. The relay device according to claim 1, wherein the regenerative relay unit carries out the modulation processing according to a modulation system different from the modulation processing applied to the signal input to the demodulation processing.

5. The relay device according to claim 1, wherein the modulation processing includes error correction encoding processing.

6. The relay device according to claim 1, wherein the switch unit includes a function of connecting each demultiplexed signal generated by the first and second demultiplexing units and an output signal in a one-to-one relation.

7. The relay device according to claim 1, wherein the switch unit includes a function of connecting each demultiplexed signal generated by the first and second demultiplexing units and an output signal in a one-to-N (N is an integer equal to or larger than 2) relation.

8. The relay device according to claim 7, wherein the switch unit duplicates each demultiplexed signal generated by the first and second demultiplexing units, to generate N output signals and multiplies each of the output signals with a weight coefficient.

9. The relay device according to claim 1, wherein the switch unit includes a function of connecting each demultiplexed signal generated by the first and second demultiplexing units and an output signal in an N (N is an integer equal to or larger than 2)-to-one relation.

10. The relay device according to claim 1, wherein the switch unit includes a function of multiplying the demultiplexed signals, generated by the first and second multiplexing units, respectively with weight coefficients and then outputting the multiplied signals to an output side.

11. The relay device according to claim 1, wherein the switch unit includes a function of adding up multiplication results, which are obtained by multiplying the demultiplexed signals, generated by the first and second multiplexing units, respectively with weight coefficients, and outputting the added-up multiplication results to an output side.

12. A relay device comprising:
   a first demultiplexing unit that demultiplexes a reception signal to generate a first demultiplexed signal in a band narrower than a band of the reception signal;
   a first multiplexing unit that multiplexes a first input signal to generate a first multiplexed signal;
   a transmission antenna that transmits the first multiplexed signal generated by the first multiplexing unit;
   a second demultiplexing unit that demultiplexes a second input signal to generate a second demultiplexed signal in a band narrower than the band of the first demultiplexed signal;
   a regenerative relay unit that carries out demodulation processing on the second demultiplexed signal and applies modulation processing to an information sequence obtained by the demodulation processing to generate a modulated signal;
   a second multiplexing unit that multiplexes the modulated signal to generate the second multiplexed signal; and
   a switch unit that inputs the first demultiplexed signal to the first multiplexing unit or the second demultiplexing unit and inputs the second multiplexed signal generated by the second multiplexing unit to the first multiplexing unit.

13. The relay device according to claim 12, wherein the regenerative relay unit includes a function of outputting the modulated signal without applying the demodulation processing and the modulation processing to the second demultiplexed signal.

14. The relay device according to claim 12, wherein the regenerative relay unit carries out the demodulation processing in a different demodulation system for each type of the demodulated signal.

15. The relay device according to claim 12, wherein the demodulation processing includes error correction decoding processing.

16. The relay device according to claim 12, wherein the regenerative relay unit carries out the modulation processing according to a modulation system different from the modulation processing applied to the signal input to the demodulation processing.

17. The relay device according to claim 12, wherein the modulation processing includes error correction encoding processing.

18. The relay device according to claim 12, wherein the switch unit includes a function of connecting each of the first demultiplexed signal and the second multiplexed signal and an output signal in a one-to-one relation.

19. The relay device according to claim 12, wherein the switch unit includes a function of connecting each of the first demultiplexed signal and the second multiplexed signal and an output signal in a one-to-N (N is an integer equal to or larger than 2) relation.

20. The relay device according to claim 12, wherein the switch unit includes a function of connecting each of the first demultiplexed signal and the second multiplexed signal and an output signal in an N (N is an integer equal to or larger than 2)-to-one relation.

21. The relay device according to claim 12, wherein the switch unit includes a function of multiplying the first demultiplexed signal and the second multiplexed signal respectively with weight coefficients and then outputting the multiplied signals to an output side.

22. The relay device according to claim 12, wherein the switch unit includes a function of adding up multiplication results, which are obtained by multiplying the first demultiplexed signal and the second multiplexed signal respectively with weight coefficients, and outputting the added-up multiplication results to an output side.

23. A satellite relay device mounted on an artificial satellite, comprising:
a first demultiplexing unit that demultiplexes a reception signal to generate a demultiplexed signal in a band narrower than a band of the reception signal;
a first multiplexing unit that multiplexes a first input signal to generate a first multiplexed signal;
a second multiplexing unit that multiplexes a second input signal to generate a second multiplex signal;
a transmission antenna that transmits the first multiplexed signal generated by the first multiplexing unit;
a regenerative relay unit that carries out demodulation processing on the second multiplexed signal generated by the second multiplexing unit and modulates an information sequence obtained by the demodulation processing to generate a modulated signal;
a second demultiplexing unit that demultiplexes the modulated signal to generate a demultiplexed signal in a band narrower than the band of the reception signal; and
a switch unit that inputs the demultiplexed signal generated by the first demultiplexing unit to the first multiplexing unit or the second multiplexing unit and inputs the demultiplexed signal generated by the second demultiplexing unit to the first multiplexing unit.

24. A satellite relay device mounted on an artificial satellite, comprising:
a first demultiplexing unit that demultiplexes a reception signal to generate a first demultiplexed signal in a band narrower than a band of the reception signal;
a first multiplexing unit that multiplexes a first input signal to generate a first multiplexed signal;
a transmission antenna that transmits the multiplexed signal generated by the first multiplexing unit;
a second demultiplexing unit that demultiplexes a second input signal to generate a second demultiplexed signal in a band narrower than the band of the first demultiplexed signal;
a regenerative relay unit that carries out demodulation processing on the second demultiplexed signal and applies modulation processing to an information sequence obtained by the demodulation processing to generate a modulated signal;
a second multiplexing unit that multiplexes the modulated signal to generate a second multiplexed signal; and
a switch unit that inputs the first demultiplexed signal to the first multiplexing unit or the second demultiplexing unit and inputs the second multiplexed signal generated by the second multiplexing unit to the first multiplexing unit.

25. A satellite relay method in a satellite relay device, comprising:
a first demultiplexing step for demultiplexing a reception signal to generate a demultiplexed signal in a band narrower than a band of the reception signal;
a first multiplexing step for multiplexing a first input signal to generate a first multiplexed signal;
a second multiplexing step for multiplexing a second input signal to generate a second multiplexed signal;
a transmitting step of transmitting the first multiplexed signal generated by the first multiplexing step;
a regenerative relaying step for carrying out demodulation processing on the second multiplexed signal generated by the second multiplexing step and modulating an information sequence obtained by the demodulation processing to generate a modulated signal;
a second demultiplexing step for demultiplexing the modulated signal to generate a demultiplexed signal in a band narrower than the band of the reception signal; and
a switching step for setting the demultiplexed signal generated in the first demultiplexing step as the first or second input signal to be multiplexed in the first multiplexing step or the second multiplexing step, respectively, and setting the demultiplexed signal generated in the second demultiplexing step as the first input signal to be multiplexed in the first multiplexing step.

26. A satellite relay method in a satellite relay device, comprising:
a first demultiplexing step for demultiplexing a reception signal to generate a first demultiplexed signal in a band narrower than a band of the reception signal;
a first multiplexing step for multiplexing a first input signal to generate a first multiplexed signal;
a transmitting step for transmitting the first multiplexed signal generated by the first multiplexing step;
a second demultiplexing step for demultiplexing a second input signal to generate a second demultiplexed signal in a band narrower than the band of the first demultiplexed signal;
a regenerative relaying step for carrying out demodulation processing on the second demultiplexed signal and applying modulation processing to an information sequence obtained by the demodulation processing to generate a modulated signal;
a second multiplexing step for multiplexing the modulated signal to generate a second multiplexed signal; and
a switching step for setting the first demultiplexed signal as an input signal to the first multiplexing step or the second demultiplexing step and setting the second multiplexed signal generated by the second multiplexing step as an input signal to the first multiplexing step.

* * * * *